United States Patent
Yana

(10) Patent No.: US 11,265,440 B2
(45) Date of Patent: Mar. 1, 2022

(54) IMAGE FORMING APPARATUS THAT RECORD RESPECTIVE IMAGES ON FRONT AND BACK SIDES OF RECORDING PAPER SHEET

(71) Applicant: KYOCERA Document Solutions Inc., Osaka (JP)

(72) Inventor: Regil Yana, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 457 days.

(21) Appl. No.: 16/338,743

(22) PCT Filed: Oct. 27, 2016

(86) PCT No.: PCT/JP2016/081794
§ 371 (c)(1),
(2) Date: Apr. 2, 2019

(87) PCT Pub. No.: WO2018/078754
PCT Pub. Date: May 3, 2018

(65) Prior Publication Data
US 2021/0281711 A1    Sep. 9, 2021

(51) Int. Cl.
*H04N 1/387* (2006.01)
*G03G 15/22* (2006.01)
(Continued)

(52) U.S. Cl.
CPC .......... *H04N 1/3877* (2013.01); *G03G 15/22* (2013.01); *H04N 1/00037* (2013.01);
(Continued)

(58) Field of Classification Search
None
See application file for complete search history.

(56) References Cited

U.S. PATENT DOCUMENTS

2019/0171137 A1* 6/2019 Kobayashi ......... H04N 1/00702

FOREIGN PATENT DOCUMENTS

JP    H11-24525 A    1/1999
JP    2000-184134 A    6/2000
(Continued)

OTHER PUBLICATIONS

Notice of Reasons for Refusal dated Dec. 3, 2019 dated in the corresponding Japanese Patent Application No. 2018-546997.

*Primary Examiner* — Scott A Rogers
(74) *Attorney, Agent, or Firm* — IP Business Solutions, LLC

(57) ABSTRACT

Even from a plurality of small documents, their front-side and back-side images to be formed on a recording paper sheet, with alignment and coincidence of the front-side and back-side images of each document between the front and back sides of the recording paper sheet. In an image forming apparatus, an image processing section detects a front-side image of an original document from a scan area read in a first scan by an image reading section, detects a back-side image of the original document from a scan area read in a second scan, and moves or rotates the front-side image and the back-side image of the original document in terms of a whole image of the scan area so that the front-side image and the back-side image of the original document are brought into alignment and coincidence between a front side and a back side of a recording paper sheet.

6 Claims, 14 Drawing Sheets

(51) Int. Cl.
*H04N 1/00* (2006.01)
*H04N 1/203* (2006.01)
*H04N 1/23* (2006.01)

(52) U.S. Cl.
CPC ..... *H04N 1/00352* (2013.01); *H04N 1/00718* (2013.01); *H04N 1/00748* (2013.01); *H04N 1/2032* (2013.01); *H04N 1/233* (2013.01); *H04N 1/3872* (2013.01); *H04N 1/3876* (2013.01)

(56) References Cited

FOREIGN PATENT DOCUMENTS

| | | | |
|---|---|---|---|
| JP | 2002-214976 | A | 7/2002 |
| JP | 2004-072452 | A | 3/2004 |
| JP | 2005-091823 | A | 4/2005 |
| JP | 2006-339770 | A | 12/2006 |
| JP | 2009-210886 | A | 9/2009 |
| JP | 2011-186241 | A | 9/2011 |
| JP | 2014-168193 | A | 9/2014 |

\* cited by examiner

SUB-SCANNING DIRECTION X

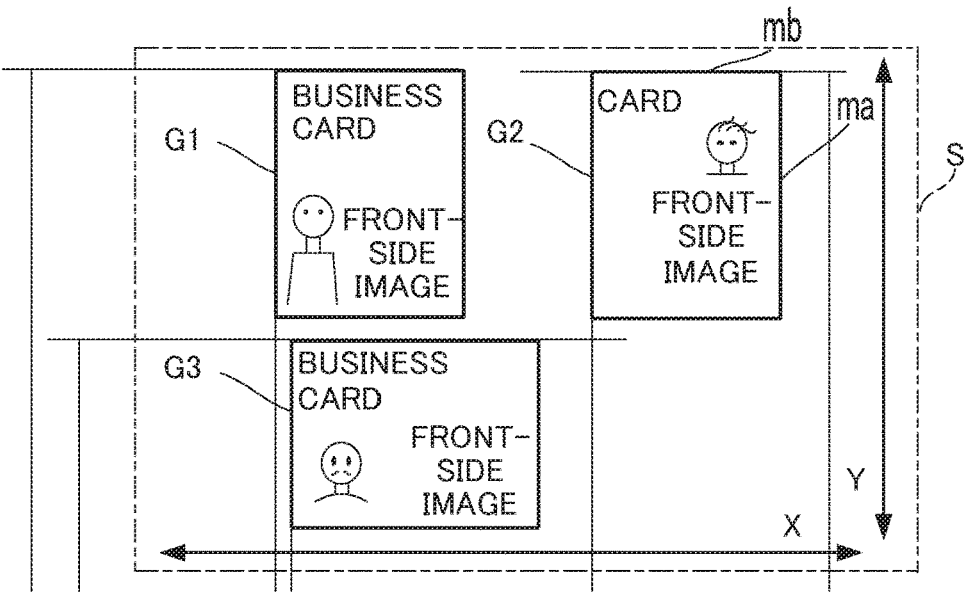
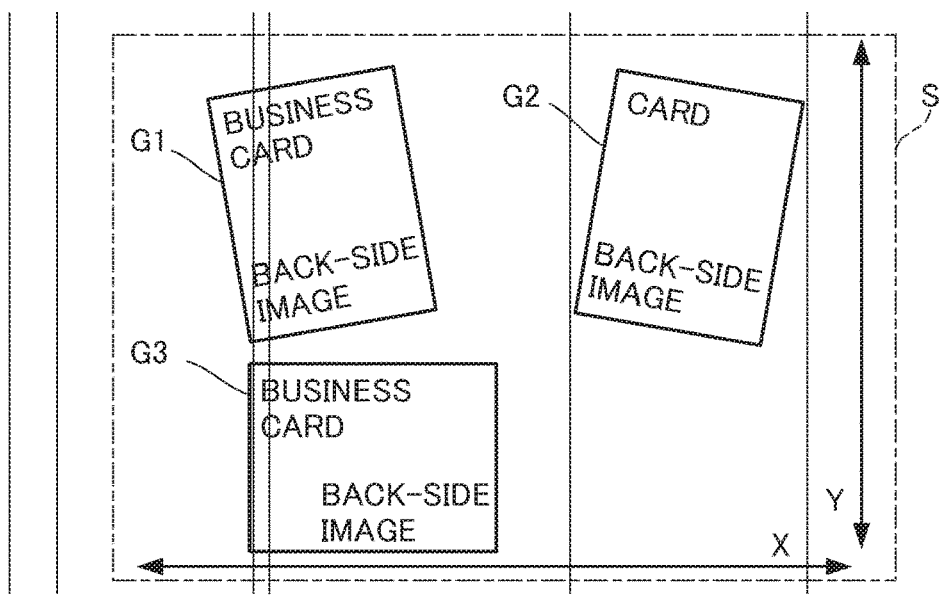
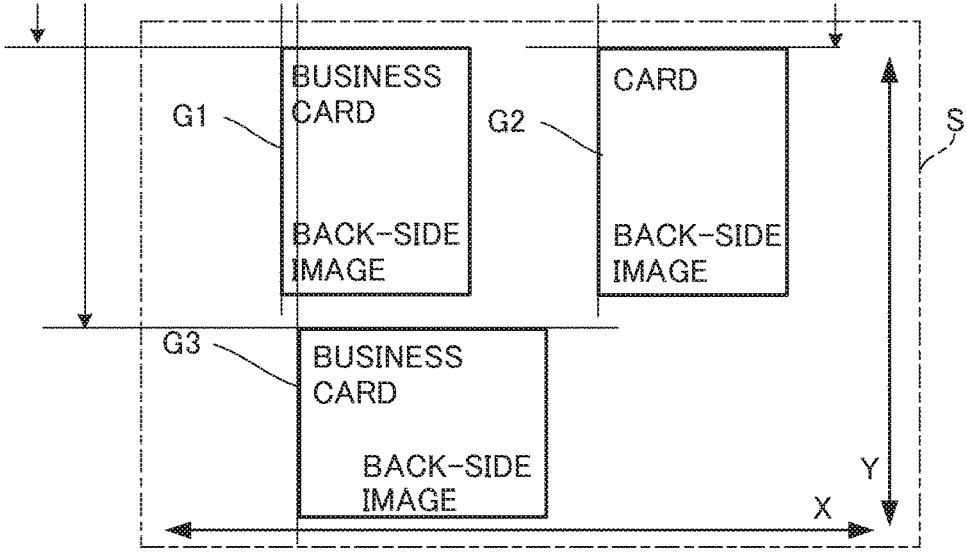

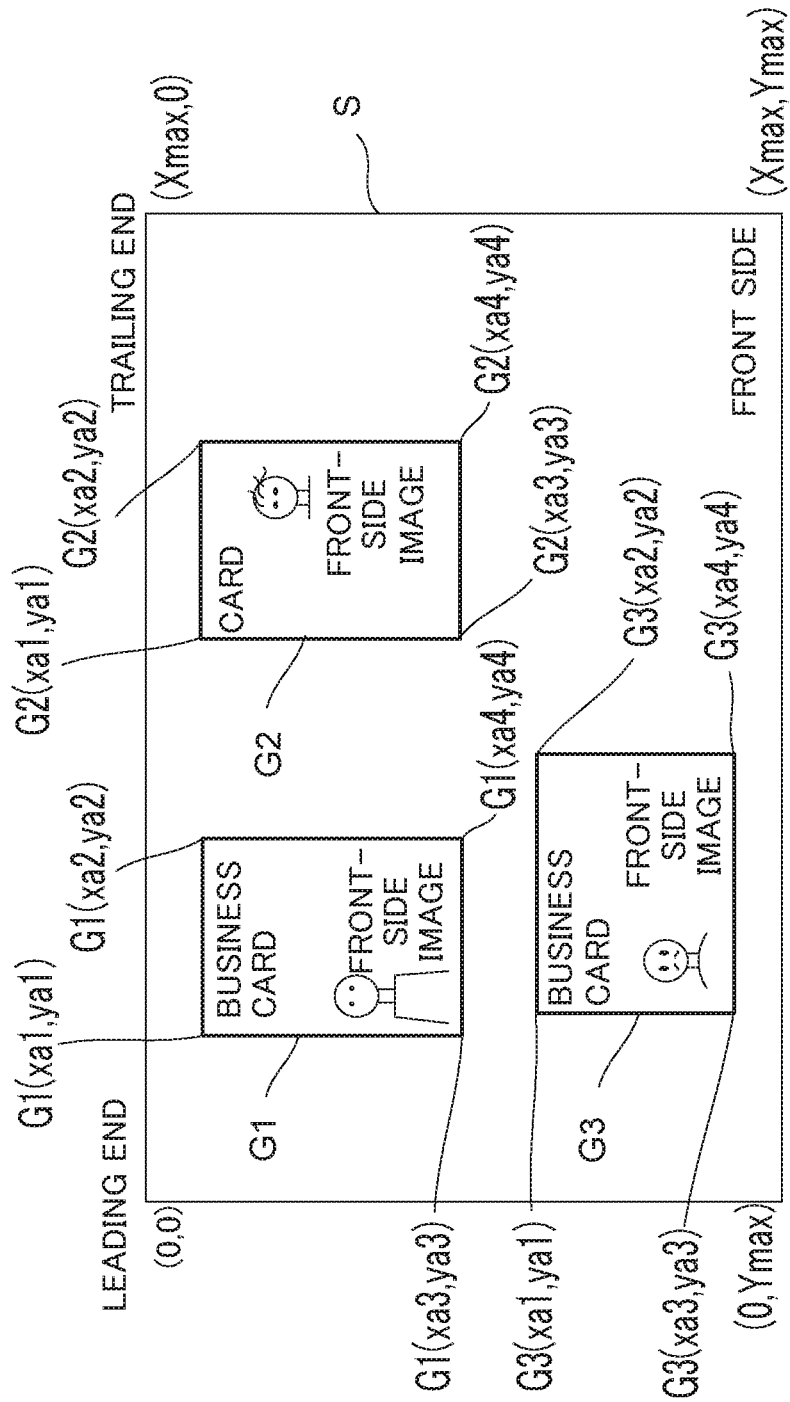

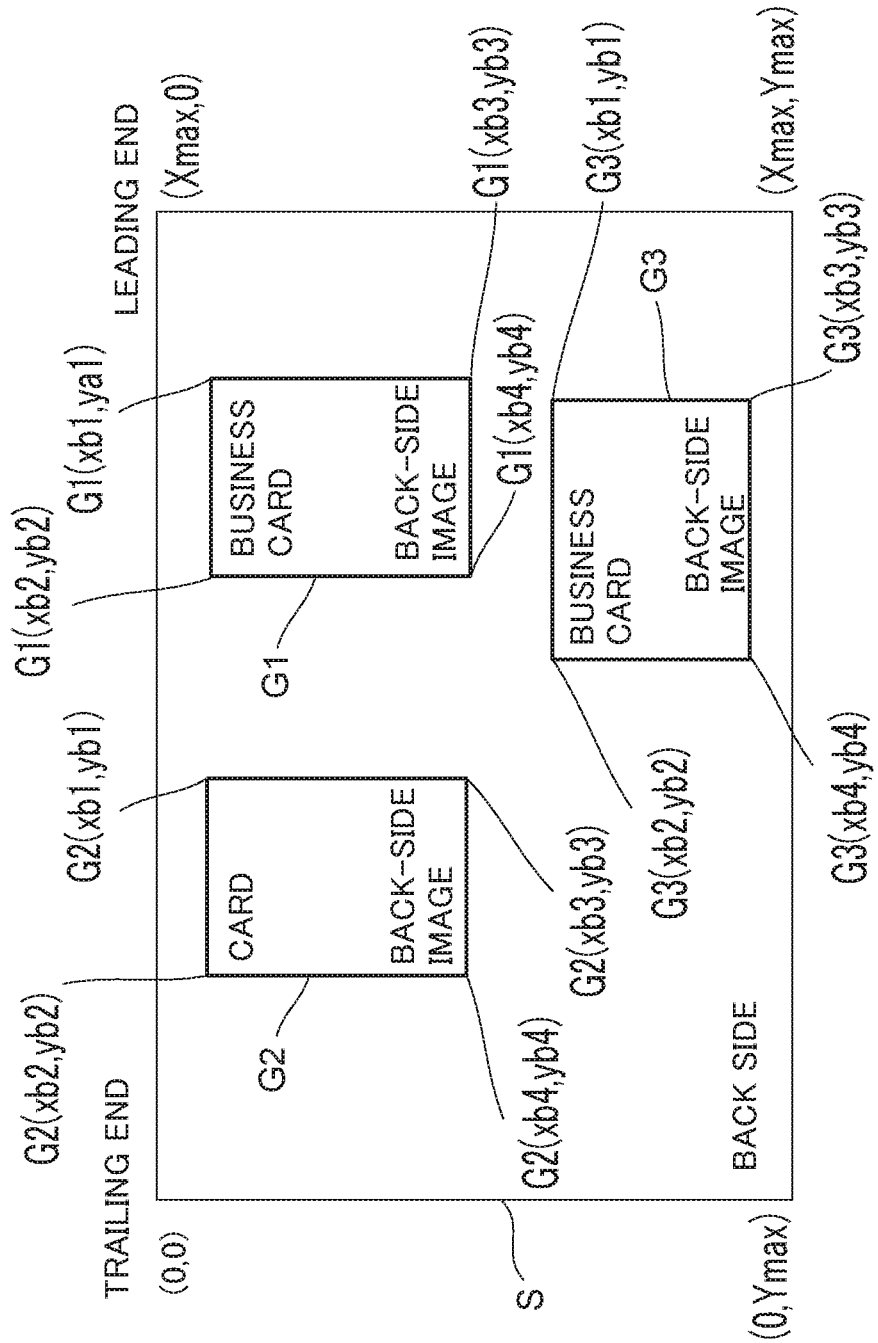

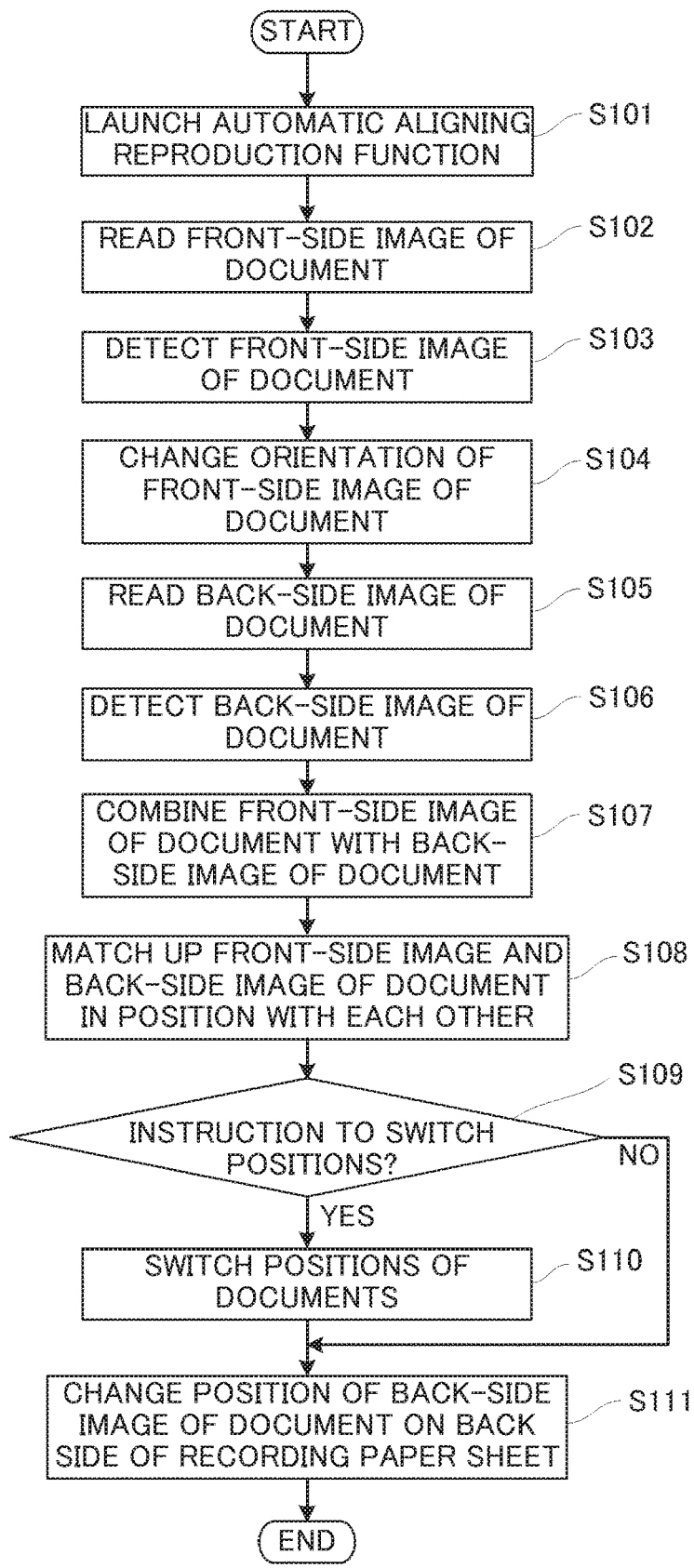

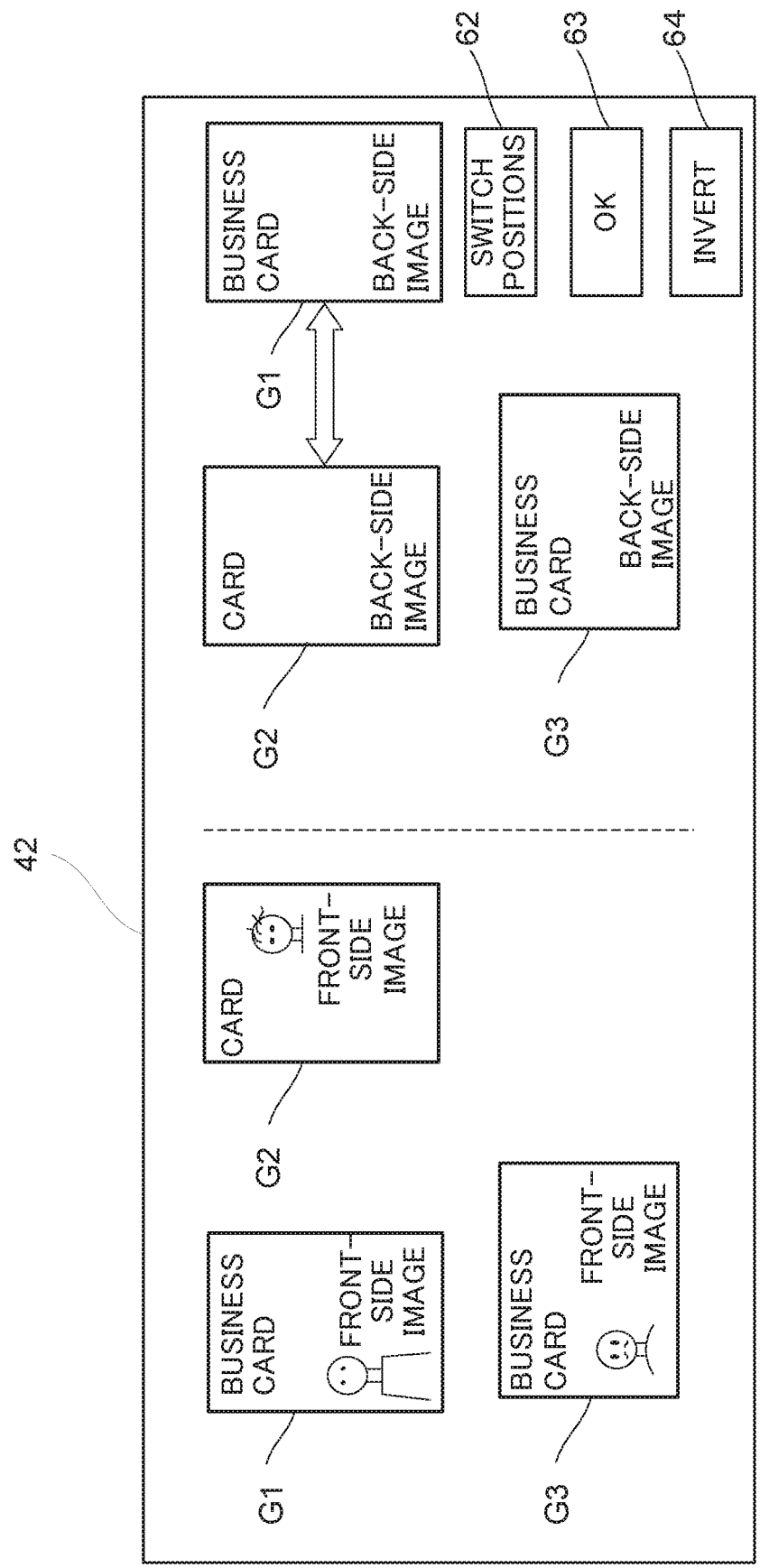

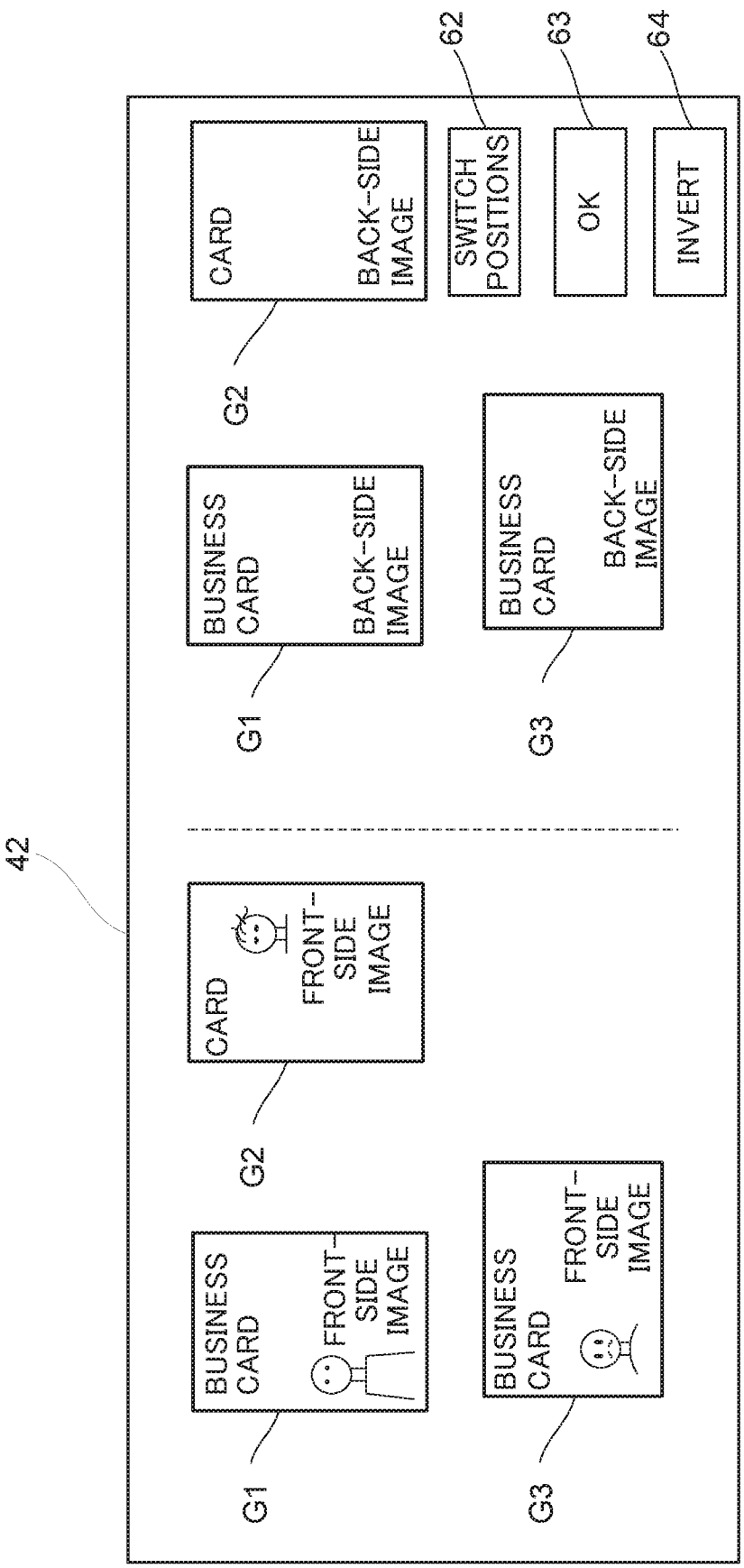

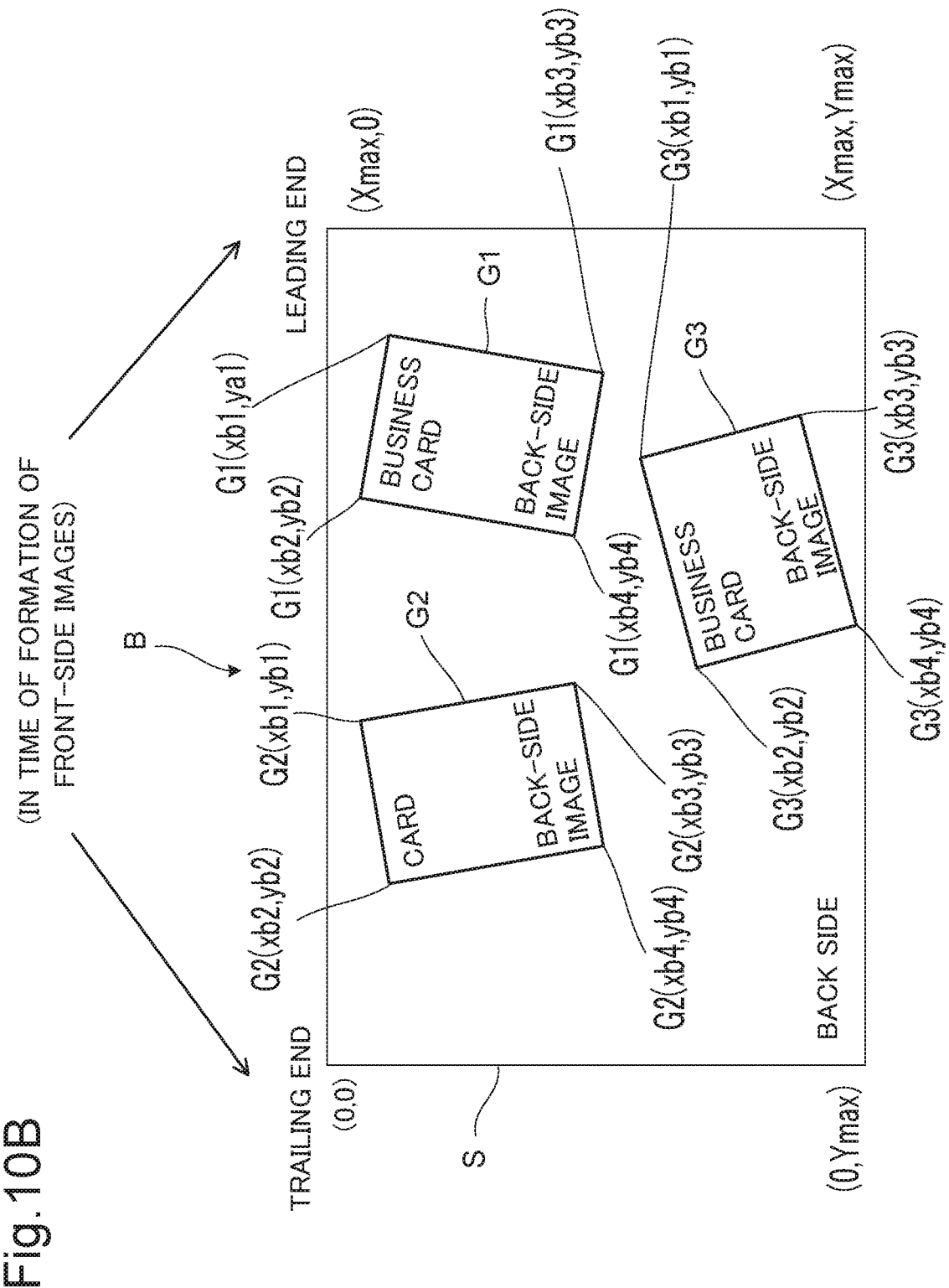

IMAGE FORMING APPARATUS THAT RECORD RESPECTIVE IMAGES ON FRONT AND BACK SIDES OF RECORDING PAPER SHEET

TECHNICAL FIELD

The present invention relates to image forming apparatuses that record respective images on the front and back sides of a recording paper sheet and particularly relates to a technique for aligning the images to be formed on the front and back sides of the recording paper sheet.

BACKGROUND ART

There is a type of image forming apparatus that can read a front-side image of an original document and a back-side image thereof, record the front-side image of the original document on the front side of a recording paper sheet, subsequently turn over the recording paper sheet, and record the back-side image of the original document on the back side of the recording paper sheet. In this case, despite a desire to align the images to be formed on the front and back sides of the recording paper sheet, the front-side and back-side images of the original document may be formed out of alignment on the front and back sides of the recording paper sheet and not exactly coincide in position.

To cope with the above, in Patent Literature 1, an accurate position adjustment is made by using an image read by a scanner to extract one edge of a recording paper sheet contained in the image, determine the coordinates of both ends of the one edge of the recording paper sheet with respect to an origin of the image, determine a vertical deviation, a lateral deviation, and a tilt of the recording paper sheet from the coordinates of both ends of the one edge of the recording paper sheet, and correct the deviations and tilt of the recording paper sheet by image processing and further determining a misalignment of images between the front and back sides of the recording paper sheet.

Alternatively, in Patent Literature 2, correcting patterns printed on the front and back sides of a recording medium are read at once by a double-sided reader to detect the respective positions of the correcting patterns, the amount of correction for print misalignment is calculated from the detected correcting patterns on both sides, and the print misalignment between the front and back sides during double-sided printing is corrected based on the calculated amount of correction.

CITATION LIST

Patent Literature

Patent Literature 1: JP-A-2005-091823
Patent Literature 2: JP-A-2011-186241

SUMMARY OF INVENTION

Technical Problem

Meanwhile, as a method of utilizing an image forming apparatus, there is a method of utilizing it by reading a front-side image and a back-side image of a small document, such as a business card or any other card, forming the front-side image and back-side image of the document on the front side and back side of a recording paper sheet, and cutting out the front-side image and back-side image of the document from the recording paper sheet to reproduce the small document, such as a business card, on both sides of which images are formed. Also in this case, it is necessary to bring the front-side image and back-side image of the document into alignment and coincidence between the front and back sides of the recording paper sheet. Furthermore, in this case, it is desirable to make it possible to concurrently read the front-side images and back-side images of a plurality of small documents and cut out reproductions of these documents from a single recording paper sheet.

However, in Patent Literature 1, since deviations and a tilt of a recording paper sheet are corrected with reference to the origin of an image read by a scanner, even images of small documents cannot concurrently be formed and need to be formed on a document-by-document basis.

On the other hand, in Patent Literature 2, since it is necessary to print correcting patterns on the front and back sides of a recording medium, it is not possible to make reproductions of general business cards and other cards.

The present invention has been made in view of the above circumstances and has an object of enabling, even from a plurality of small documents, their front-side and back-side images to be formed on a single recording paper sheet, with alignment and coincidence of the front-side and back-side images of each document between the front and back sides of the single recording paper sheet.

Solution to Problem

An image forming apparatus according to an aspect of the present invention includes: an image reading section that reads images of an original document; a control section that allows the image reading section to read a front-side image of the original document in a first scan and then read a back-side image of the original document in a second scan; an image processing section that detects the front-side image of the original document from a whole image of a scan area read in the first scan by the image reading section, detects the back-side image of the original document from a whole image of a scan area read in the second scan by the image reading section, and performs image processing of moving or rotating the front-side image or the back-side image of the original document to move a position of the front-side image or the back-side image of the original document in the whole image of the scan area to a position where the front-side image and the back-side image are brought into alignment and coincidence between a front side and a back side of a recording paper sheet; and an image forming section that, under control of the control section, forms on the front side of the recording paper sheet the whole image of the scan area read in the first scan and subjected to the image processing by the image processing section and forms on the back side of the recording paper sheet the whole image of the scan area read in the second scan and subjected to the image processing by the image processing section.

Advantageous Effects of Invention

The present invention enables, even from a plurality of small documents, their front-side and back-side images to be formed on a single recording paper sheet, with alignment and coincidence of the front-side and back-side images of each document between the front and back sides of the single recording paper sheet.

BRIEF DESCRIPTION OF DRAWINGS

FIGS. 4A and 4C are views showing front-side images and back-side images of three original documents read by the image reading section and FIGS. 4B and 4D are views showing the front-side images and back-side images of the three original documents aligned by an image processing section.

FIG. 6A is a view showing a coordinate system corresponding to the recording paper sheet on which the front-side images of the three original documents are recorded starting at the leading end and FIG. 6B is a view showing a coordinate system corresponding to the recording paper sheet on which the back-side images of the three original documents are recorded starting at the trailing end and showing a state where the positions of the back-side images of the three original documents have been corrected.

FIG. 7 is a flowchart showing a procedure of image processing of the image forming apparatus according to this embodiment.

FIG. 9A is a view showing a screen of the display section on which the front-side images and back-side images of the three original documents read by the image reading section are displayed and FIG. 9B is a view showing a state where the positions of the back-side images of two original documents have been switched.

FIGS. 10A and 10B are views used for illustrating a procedure of another type of image processing for correcting the positions of the back-side images of the three original documents.

DESCRIPTION OF EMBODIMENTS

Hereinafter, a description will be given of embodiments of the present invention with reference to the drawings.

Figure 1:
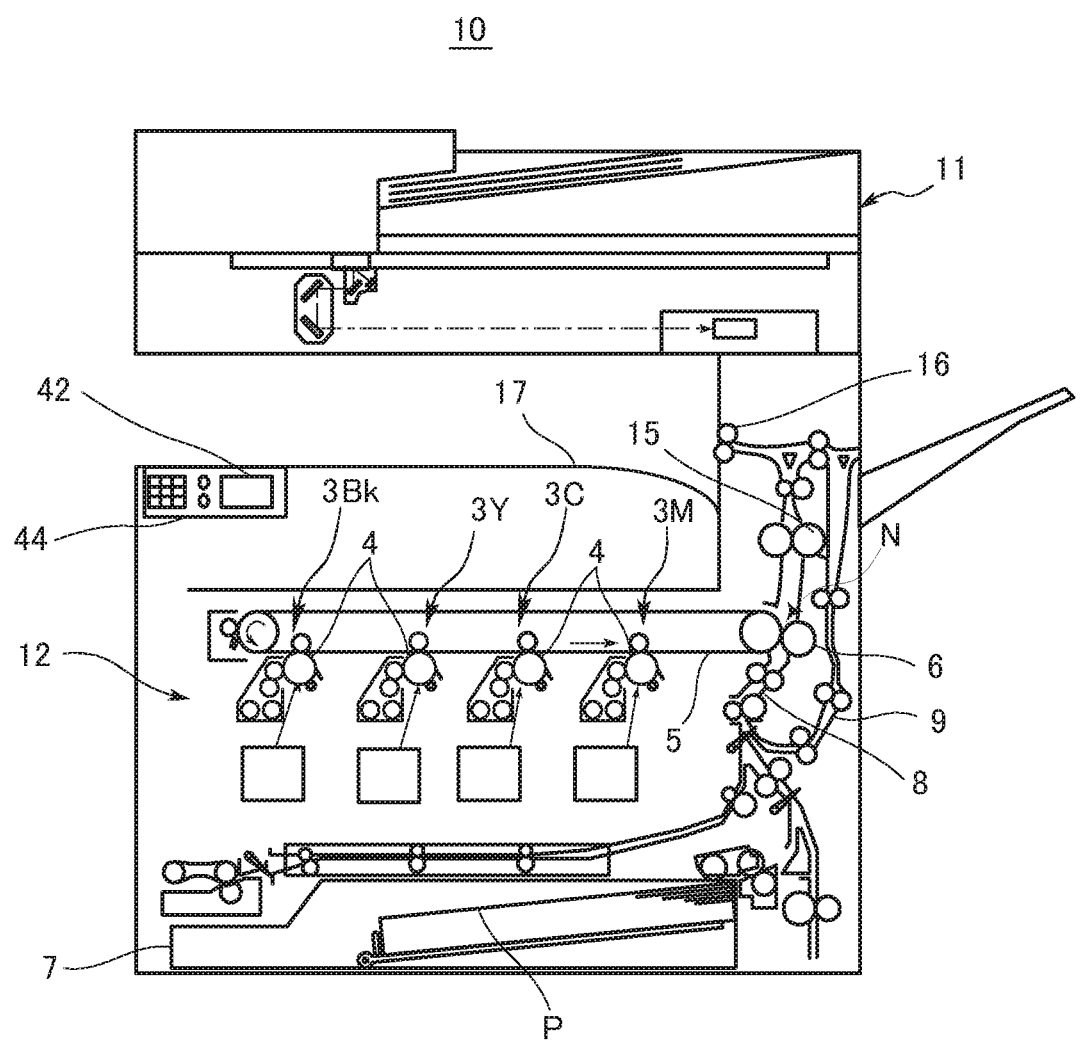
FIG. 1 is a cross-sectional view showing an image forming apparatus according to an embodiment of the present invention.

FIG. 1 is a cross-sectional view showing an image forming apparatus according to an embodiment of the present invention. An image forming apparatus 10 according to this embodiment is an MFP (multifunction peripheral) having multiple functions including, for example, a copy function, a print function, a scan function, and a facsimile function. This image forming apparatus 10 includes an image reading section 11 and an image forming section 12.

The image reading section 11 includes a scanner capable of optically reading an original document and generates image data representing an image of this original document.

The image forming section 12 is a section that prints on a recording paper sheet the image represented by the image data generated by the image reading section 11, and includes an image forming unit 3M for magenta, an image forming unit 3C for cyan, an image forming unit 3Y for yellow, and an image forming unit 3Bk for black. Each of these image forming units 3M, 3C, 3Y, and 3Bk uniformly charges the surface of a photosensitive drum 4, exposes the surface of the photosensitive drum 4 to light to form an electrostatic latent image on the surface of the photosensitive drum 4, develops the electrostatic latent image on the surface of the photosensitive drum 4 into a toner image, and transfers the toner image on the surface of the photosensitive drum 4 to an intermediate transfer belt 5. Thus, a multicolor toner image (an image) is formed on the intermediate transfer belt 5. This multicolor toner image is secondarily transferred, at a nip region N between the intermediate transfer belt 5 and a secondary transfer roller 6, to a recording paper sheet P conveyed from a sheet feed section 7 via a first conveyance path 8.

Thereafter, heat and pressure are applied to the recording paper sheet P by a fixing device 15, so that the toner image on the recording paper sheet P is fixed by heat and pressure. Then, the recording paper sheet P is discharged through an ejection roller pair 16 to a sheet output tray 17.

In further recording an image on the back side of the recording paper sheet P, the ejection roller pair 16 is stopped and then reversely rotated to convey the recording paper sheet P from the ejection roller pair 16 to a second conveyance path 9, the recording paper sheet P is returned to the nip region N in the first conveyance path 8 and thus turned over, and an image is recorded on the back side of the recording paper sheet P.

Figure 2:
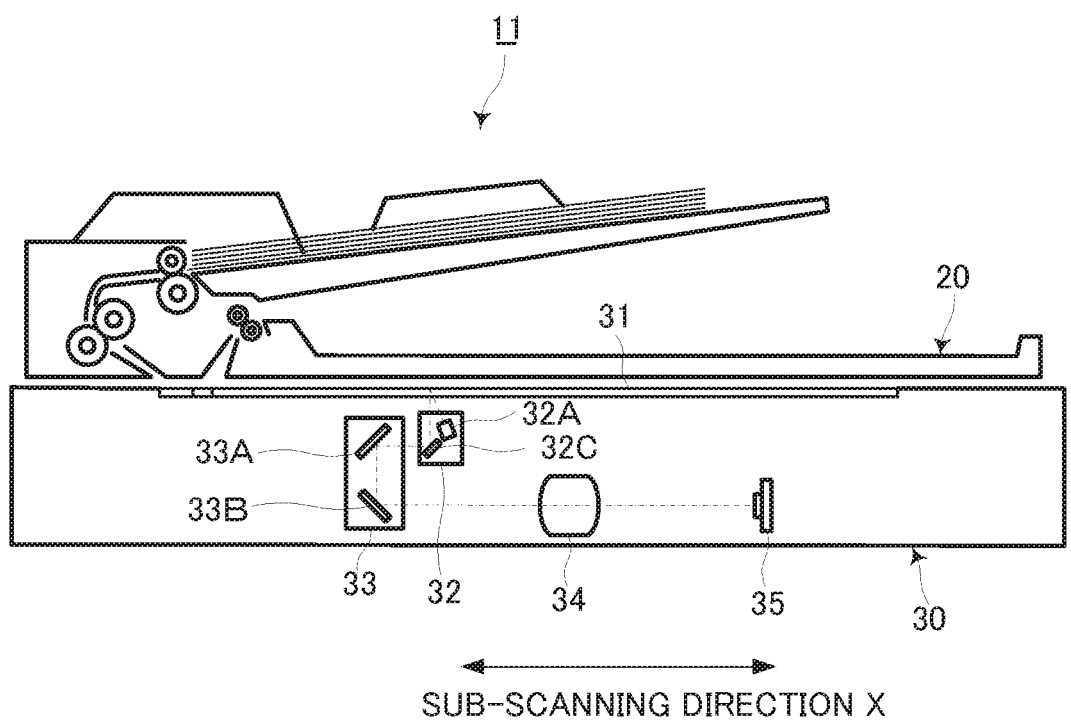
FIG. 2 is a cross-sectional view showing an image reading section in the image forming apparatus according to this embodiment.

FIG. 2 is a cross-sectional view showing a mechanical structure of the image reading section 11 in this embodiment. As shown in FIG. 2, the image reading section 11 includes an original cover 20 and a scanner section 30. A hinge is provided on one side of a top surface of the scanner section 30 and the original cover 20 is supported openably and closably by the hinge, which enables a user to open and close the original cover 20.

When the original cover 20 is opened, a platen glass (original glass plate) 31 of the scanner section 30 is open, so that an original document can be placed on the platen glass 31. When the original cover 20 is then closed, the original document placed on the platen glass 31 is held by the original cover 20. In the scanner section 30, while a carriage 32 and an optical unit 33 are moved in a sub-scanning direction X with consistency of a predetermined relationship of velocity, the original document is irradiated through the platen glass 31 with light from a light source 32A of the carriage 32 and light reflected at the original document is reflected by a mirror 32C of the carriage 32. Then, the light is further reflected by a mirror 33A and a mirror 33B of the optical unit 33 and enters a CCD sensor 35 through a condensing lens 34. At this time, the condensing lens 34 forms an image of the original document on an acceptance surface of the CCD sensor 35 and the CCD sensor 35 repeatedly reads the image of the original document in a main scanning direction Y (a direction perpendicular to the sub-scanning direction X).

Figure 3:
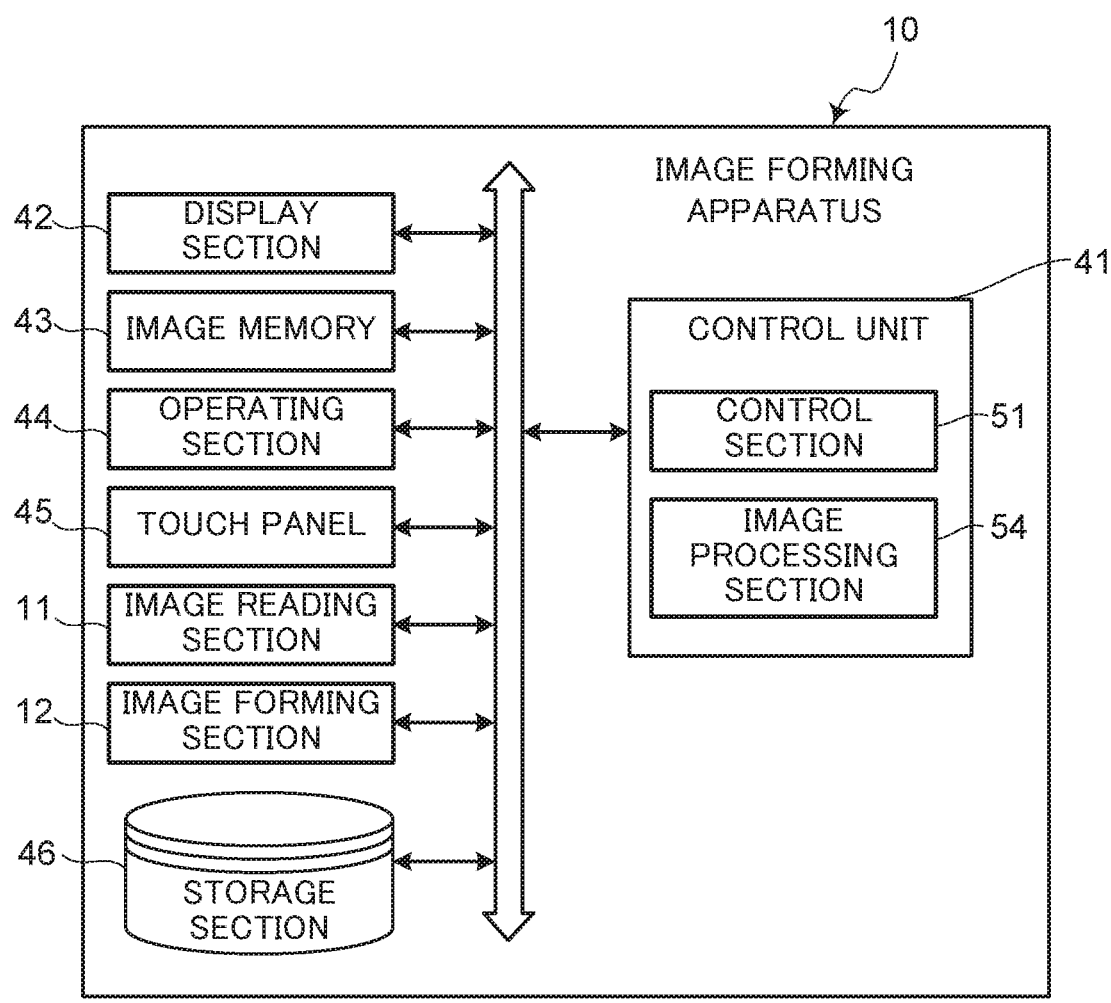
FIG. 3 is a functional block diagram showing the configuration of the image forming apparatus according to this embodiment.

FIG. 3 is a functional block diagram showing an essential internal configuration of the image forming apparatus 10. As shown in FIG. 3, the image forming apparatus 10 includes a control unit 41, a display section 42, an image memory 43, an operating section 44, a touch panel 45, the image reading section 11, the image forming section 12, and a storage section 46.

The display section 42 is formed of a liquid crystal display (LCD), an organic EL (OLED: Organic Light-Emitting Diode) display or the like.

The touch panel 45 is disposed on the screen of the display section 42. The touch panel 45 is a touch panel of a so-called resistive film system, a capacitance system or any other system, detects a touch of the touch panel 45 with a user's finger or the like, together with a point of touch, and outputs a detection signal indicating the coordinate of the point of touch to a below-described control section 51 of the control unit 41 and so on. Therefore, the touch panel 45 serves as an operating section through which a user's operation by gesture on the screen of the display section 42 is to be input.

The image memory 43 temporarily stores image data on the original document read by the image reading section 11.

The operating section 44 includes hard keys, including an Enter key and a Start key.

The storage section 46 is a large storage device, such as an HDD (Hard Disk Drive).

The control unit 41 is composed of a CPU (Central Processing Unit), a RAM (Random Access Memory), a ROM (Read Only Memory), and so on. When a program stored on the above ROM or the storage section 46 is executed by the above CPU, the control unit 41 functions as the control section 51 and an image processing section 54. Alternatively, each component of the control unit 41 may not be implemented by the operation in accordance with the program but may be constituted by a hardware circuit.

The control section 51 governs the overall operation control of the image forming apparatus 10. The control section 51 accepts a user's gesture on the touch panel 45, based on the detection signal output from the touch panel 45. Furthermore, the control section 51 also accepts a user's operation on any hard key of the operating section 44.

The control section 51 controls the display section 42 to allow the display section 42 to display an entry screen for setting items necessary for image formation processing, an entry screen for information, operation guidance of the image forming apparatus 10 or so on.

The image processing section 54 subjects image data in the image memory 43 to various types of image processing.

The image forming apparatus 10 has a function for reproducing a small document, such as a business card or any other card (hereinafter, referred to as an automatic aligning reproduction function). During the execution of this automatic aligning reproduction function, the image forming apparatus 10 allows, under the control of the control section 51, the scanner section 30 to read a front-side image of a small document, such as a business card or any other card, placed on the platen glass 31 by a user (a first scan), followed by user's turnover of the document, and then allows the scanner section 30 to read a back-side image of the document (a second scan). Thereafter, under the control of the control section 51, the front-side image and back-side image of the document are formed on the front side and back side of a recording paper sheet by the image forming section 12 and brought into alignment and coincidence with each other between the front side and back side of the recording paper sheet. Thus, the user can cut out a reproduction of a business card or any other card from a single recording paper sheet. Furthermore, it also becomes possible to concurrently read the front-side images and back-side images of a plurality of small documents and cut out reproductions of these documents from a single recording paper sheet.

Figure 4A:
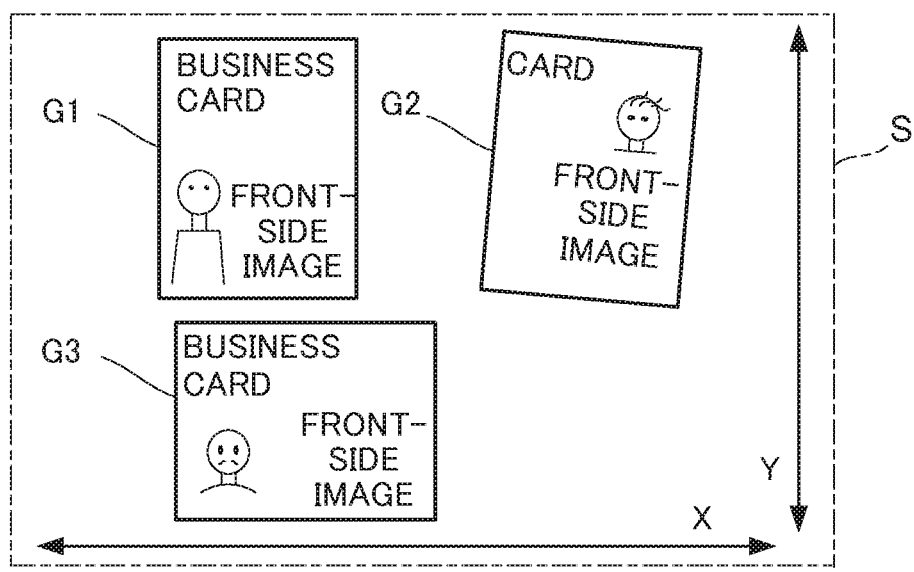

For example, the user places three original documents G1, G2, G3 on the platen glass 31 as shown in FIG. 4A. Under the control of the control section 51, the scanner section 30 reads a whole image of a scan area S containing the original documents G1, G2, G3 in a first scan and the image memory 43 stores image data representing the whole image of the scan area S (containing the front-side images of the original documents G1, G2, G3). Note that the front-side images of the original documents G1, G2, G3 shown in FIGS. 4A to 4D show states where the original documents G1, G2, G3 placed on the platen glass 31 are seen through the platen glass 31 from the interior of the scanner section 30.

Based on the image data representing the whole image of the scan area S and stored in the image memory 43, the image processing section 54 detects four edges of each of the original documents G1, G2, G3 and detects, for each of the original documents G1, G2, and G3, a rectangular region surrounded by the four edges of the original document as a front-side image of the original document.

In the whole image of the scan area S containing the three original documents G1, G2, G3 placed on the platen glass 31, lighting from the light source 32A of the carriage 32 forms shadows along the edges of the original documents, which makes the density difference between regions within and outside the edges of each original document larger. In this consideration, the image processing section 54 uses a known technique to detect, based on the image data representing the whole image of the scan area S, linear boundaries the density difference between regions within and outside of which is beyond a preset threshold as the edges and detects each rectangular region surrounded by the four edges (four sides) as a front-side image of one original document.

Then, the image processing section 54 changes the orientations of the front-side images of the original documents by rotating the front-side images of the original documents so that, as shown in FIG. 4B, two edges ma of the edges (four sides) defining the front-side image of each original document extend along the main scanning direction Y and the other two edges mb extend along the sub-scanning direction X.

Subsequently, as shown in FIG. 4C, the user turns over the original documents G1, G2, G3 and places them on the platen glass 31 again. Under the control of the control section 51, the scanner section 30 reads a whole image of a scan area S containing the original documents G1, G2, G3 in a second scan and the image memory 43 stores image data representing the whole image of the scan area S (containing the back-side images of the original documents G1, G2, G3).

Based on the image data representing the whole image of the scan area S and stored in the image memory 43, the image processing section 54 likewise detects four sides of each of the original documents G1, G2, G3 and detects, for each original document, a rectangular region surrounded by the four edges of the original document as a back-side image of the original document.

Then, the image processing section 54 changes the orientations of the back-side images of the original documents by rotating the back-side images of the original documents so that, as shown in FIG. 4D, two edges ma of the edges (four sides) defining the back-side image of each original document extend along the main scanning direction Y and the other two edges mb extend along the sub-scanning direction X.

Then, the image processing section 54 compares the whole image of the scan area S in the first scan as shown in FIG. 4A with the whole image of the scan area S in the second scan as shown in FIG. 4C and combines each pair of images equal or approximately equal in horizontal and vertical sizes of the rectangular region and nearest in position within the whole image of the scan area S as a pair of images forming the front and back sides of one original document. In this manner, the image processing section 54 combines the front-side image and back-side image of the original document G1, combines the front-side image and back-side image of the original document G2, and combines the front-side image and back-side image of the original document G3. Note that "each pair of images nearest in position" described above refers to, for example, among the front-side images and back-side images of the original documents, each pair of images having the greatest overlap in terms of image position.

Furthermore, the image processing section 54 rotates or moves, for each of the original documents G1, G2, and G3, the back-side image of the original document so that, as shown in FIG. 4D, the back-side image of the original document is aligned and matched up in position with the front-side image of the original document. For example, the image processing section 54 rotates or moves the back-side image of the original document so that the upper left corner of the front-side image of the original document is aligned with the upper left corner of the back-side image of the original document and the top and left edges of the front-side image of the original document are aligned with the top and left edges of the back-side image of the original document. In this manner, the image processing section 54 places the front-side image and back-side image of each of the original documents G1, G2, G3 at the same position in terms of the whole image of the scan area S.

Although in this embodiment the image processing section 54 rotates or moves the back-side image of the original document to align it with the position of the front-side image of the original document within the whole image of the scan area S, the manner of alignment is not limited to this and the image processing section 54 may rotate or move the front-side image of the original document to align it with the position of the back-side image of the original document within the whole image of the scan area S.

Figure 5A:
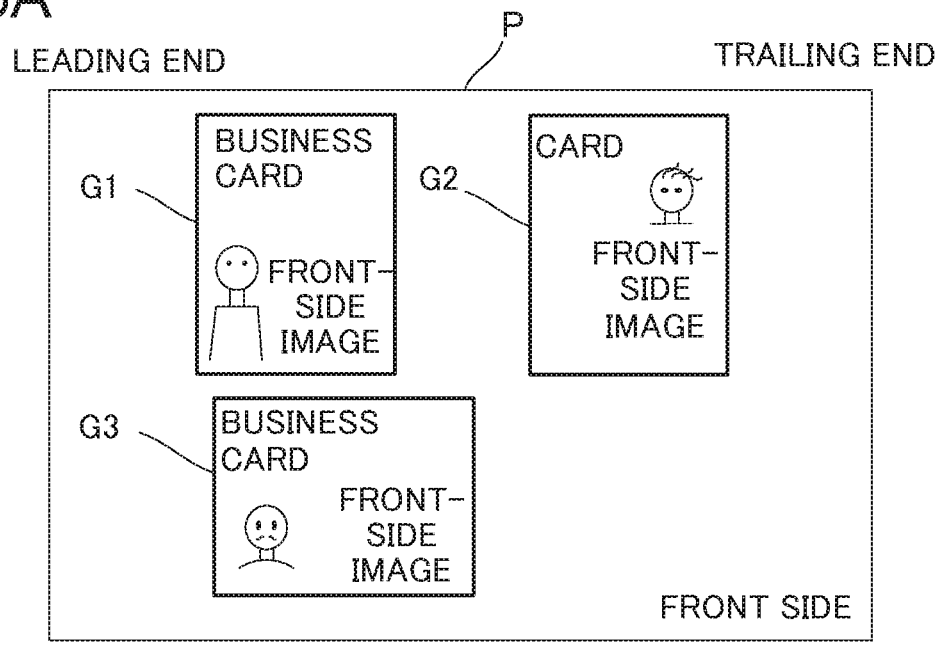
FIG. 5A is a view showing a state where the front-side images of the three original documents are recorded starting at a leading end of a recording paper sheet and FIG. 5B is a view showing a state where the back-side images of the three original documents are recorded starting at a trailing end of the recording paper sheet.
Figure 5B:
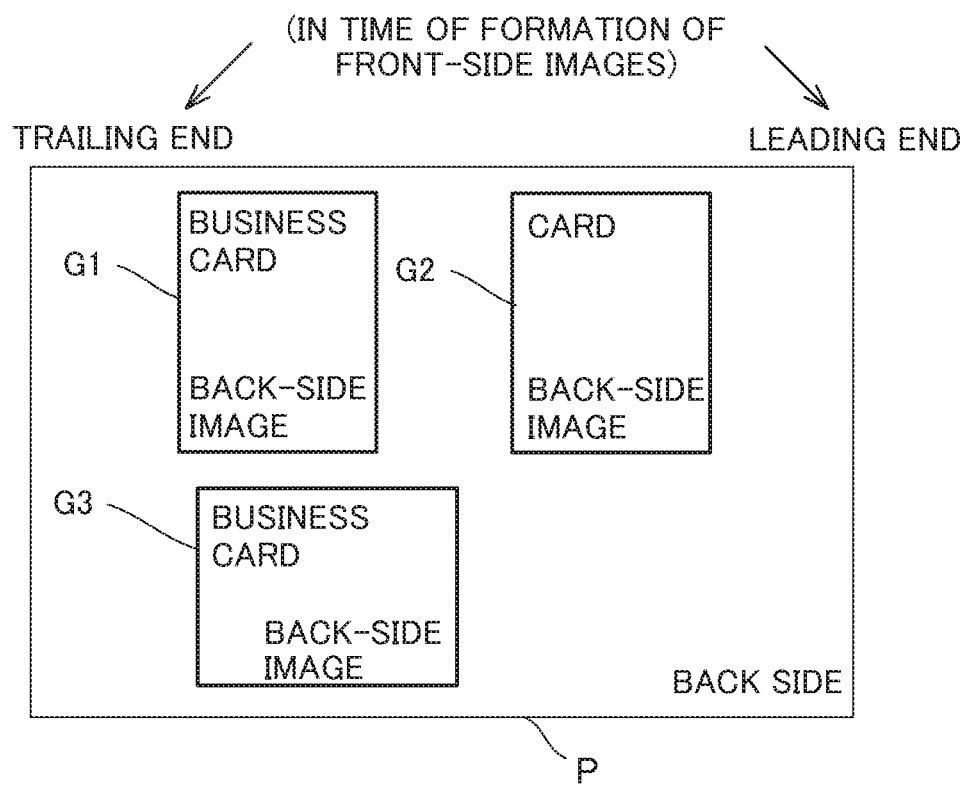

Next, the control section 51 allows the image forming section 12 to form images on the front side of a recording paper sheet P as previously described, then turn over the recording paper sheet P, and then form images on the back side of the recording paper sheet P. In doing so, in view of the structure of the image forming apparatus 10 shown in FIG. 1, if the control section 51 has allowed the image forming section 12 to form the front-side images starting at the leading end of the recording paper sheet P, the back-side images will be formed starting at an end of the recording paper sheet P which was the trailing end thereof in the time of formation of the front-side images. Specifically, after the front-side images of the original documents G1, G2, G3 shown in FIG. 4B are formed on the front side of the recording paper sheet P, the back-side images of the original documents G1, G2, G3 shown in FIG. 4D will be formed on the back side of the recording paper sheet P as they are. In this case, as shown in FIGS. 5A and 5B, the front-side image and back-side image of each of the original documents G1, G2, G3 will be located out of coincidence between the front side and back side of the recording paper sheet P. Therefore, if no measures are taken, the front-side image and back-side image of each original document G1, G2, G3 cannot be brought into coincidence between the front and back sides.

To cope with the above and bring the front-side image and back-side image of each original document G1, G2, G3 into alignment and coincidence with each other between the front side and back side of the recording paper sheet P before image formation by the image forming section 12, the image processing section 54 rotates or moves the back-side image of each original document G1, G2, G3 shown in FIG. 4D.

For example, for the whole image of the scan area S in the first scan shown in FIG. 4B, the image processing section 54 sets the respective sides corresponding to a leading end and a trailing end of the recording paper sheet P, sets a point on the whole image of the scan area S coinciding with the upper corner of the leading end of the recording paper sheet P, and sets this point as an origin. Along with this, the image processing section 54 sets the coordinates of points on the whole image of the scan area S coinciding with the other three corners of the recording paper sheet P. The image processing section 54 defines, based on the origin and three coordinates, a coordinate system A as shown in FIG. 6A for the whole image of the scan area S and calculates, for each of the front-side images of the original documents G1, G2, and G3, the coordinates of the corners of the front-side image. Note that each of the coordinates of the corners of the front-side image of each original document is a coordinate of a point where two edges defining the front-side image intersect each other.

Furthermore, also for the whole image of the scan area S in the second scan shown in FIG. 4D, the image processing section 54 sets the respective sides corresponding to a leading end and a trailing end of the recording paper sheet P, sets a point on the whole image of the scan area S coinciding with the upper corner of the leading end of the recording paper sheet P, and sets this point as an origin. Along with this, the image processing section 54 sets the coordinates of points on the whole image of the scan area S coinciding with the other three corners of the recording paper sheet P. The image processing section 54 defines, based on the origin and three coordinates, a coordinate system B as shown in FIG. 6B for the whole image of the scan area S.

Then, in relation to this coordinate system B, the image processing section 54 calculates, for each of the back-side images of the original documents G1, G2, and G3 and based on the coordinates of the corners of the front-side image and the coordinates of the corners of the recording paper sheet P in the coordinate system A, the coordinates of the corners of the back-side image at which the front-side image and the back-side image of the original document will be brought into alignment and coincidence between the front side and back side of the recording paper sheet P. Note that each of the coordinates of the corners of the back-side image of each original document is a coordinate of a point where two edges defining the back-side image intersect each other.

For example, the image processing section 54 sets, in the coordinate system A shown in FIG. 6A, the coordinates of the corners of the recording paper sheet P at (0, 0), (X max, 0), (0, Y max), and (X max, Y max) and sets, for each of the front-side images of the original documents G1, G2, and G3, the coordinates of the corners of the front-side image at (xa1, ya1), (xa2, ya2), (xa3, ya3), and (xa4, ya4). Furthermore, the image processing section 54 sets, in the coordinate system B shown in FIG. 6B, the coordinates of the corners of the recording paper sheet P at (0, 0), (X max, 0), (0, Y max), and (X max, Y max) and sets, for each of the back-side images of the original documents G1, G2, and G3, the coordinates of the corners of the back-side image at (xb1, yb1), (xb2, yb2), (xb3, yb3), and (xb4, yb4).

Then, the image processing section 54 determines, based on the following Equations (1) to (4), the coordinates (xb1, yb1), (xb2, yb2), (xb3, yb3), and (xb4, yb4) of the corners of each back-side image in the coordinate system B. Note that the coordinate values X max and Y max correspond to the size of the recording paper sheet P.

$$(xb1, yb1) = ((X\max - xa1), ya1) \quad (1)$$

$$(xb2, yb2) = ((X\max - xa2), ya2) \quad (2)$$

$$(xb3, yb3) = ((X\max - xa3), ya3) \quad (3)$$

$$(xb4, yb4) = ((X\max - xa4), ya4) \quad (4)$$

In this manner, the image processing section 54 calculates, for each of the back-side images of the original documents G1, G2, G3 in the coordinate system B, the coordinates of the corners as (xb1, yb1), (xb2, yb2), (xb3, yb3), and (xb4, yb4). As shown in FIG. 6B, the image processing section 54 moves the position of the back-side image of each of the original documents G1, G2, G3 to a position indicated by the calculated coordinates (xb1, yb1), (xb2, yb2), (xb3, yb3), and (xb4, yb4) of the corners of the back-side image of each of the original documents G1, G2, G3 in the coordinate system B. In other words, the image processing section 54 aligns the corners of the back-side image of each original document with the above-calculated coordinates of the corners.

In this manner, the image processing section 54 appropriately changes, with reference to the leading end of the recording paper sheet P, the positions and orientations of the back-side images of the original documents G1, G2, G3 within the whole image of the scan area S and thus enables the front-side image and back-side image of each of the original documents G1, G2, G3 to be brought into alignment and coincidence between the front side and back side of the recording paper sheet P when the front-side images and back-side images of the original documents G1, G2, G3 are formed on the front side and back side of the recording paper sheet P by the image forming section 12. As a result of this, business cards or other cards having images formed on their front and back sides can be created from a single recording paper sheet P by cutting out the image areas of the original documents G1, G2, G3 formed on the recording paper sheet P from the recording paper sheet P.

Next, with reference to the flowchart of FIG. 7 or other figures, a description will be given of a processing procedure on the image forming apparatus 10 from reading out front-side images and back-side images of original documents until bringing the front-side images and back-side images into alignment and coincidence between the front side and back side of a recording paper sheet.

Figure 8:
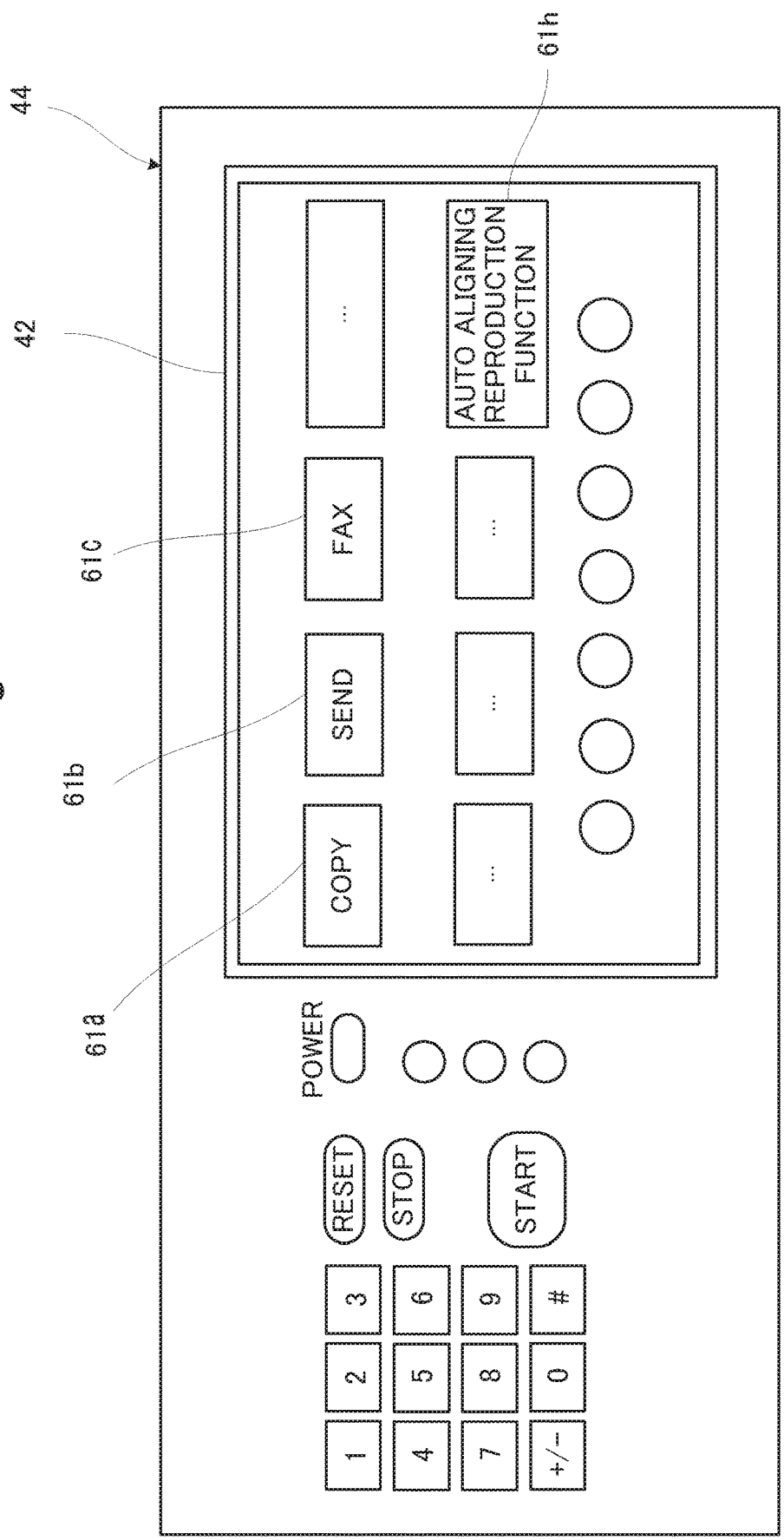
FIG. 8 is a plan view showing an operating section and a display section in the image forming apparatus according to this embodiment.

First, a user places, for example, three original documents G1, G2, G3 on the platen glass 31 as shown in FIG. 4A. In doing so, the control section 51 allows the display section 42 to display images of a plurality of touch keys 61a to 61h associated with individual functions and other images as shown in FIG. 8. The user makes a touch gesture on the touch key 61h associated with the above-described "automatic aligning reproduction function". When this touch gesture is accepted through the touch panel 45 by the control section 51, the control section 51 launches the automatic aligning reproduction function (an application program) (step S101).

Then, when the user operates the Start key of the operating section 44 and this operation is accepted by the control section 51, the control section 51 allows the scanner section 30 of the image reading section 11 to perform a first scan to read the front-side images of the original documents G1, G2, G3 on the platen glass 31 (step S102). The scanner section 30 reads a scan area S containing the original documents G1, G2, G3 through the platen glass 31 and the image memory 43 stores image data representing the whole image of the scan area S (containing the front-side images of the original documents G1, G2, G3).

Based on the image data representing the whole image of the scan area S containing the front-side images of the original documents, the image processing section 54 detects four edges of each of the original documents G1, G2, G3 and detects, for each original document, a rectangular region surrounded by the four edges of the original document as a front-side image of the original document (step S103).

Then, the image processing section 54 corrects the orientations of the front-side images of the original documents by rotating, for each of the original documents G1, G2, and G3, the front-side image of the original document so that the edges defining the front-side image of the original document extend along the main scanning direction Y and the sub-scanning direction X (step S104).

Subsequently, as shown in FIG. 4C, the user turns over the original documents G1, G2, and G3, places them on the platen glass 31 again, and operates the Start key of the operating section 44. When this operation of the Start key is accepted by the control section 51, the control section 51 allows the scanner section 30 to perform a second scan to read the back-side images of the original documents G1, G2, G3 on the platen glass 31 (step S105) and allows the image memory 43 to store image data representing the whole image of the scan area S (containing the back-side images of the original documents G1, G2, G3).

Based on the image data representing the whole image of the scan area S containing the back-side images of the original documents, the image processing section 54 detects four edges of each of the original documents G1, G2, G3 and detects, for each original document, a rectangular region surrounded by the four edges of the original document as a back-side image of the original document (step S106).

Furthermore, the image processing section 54 compares the whole image of the scan area S in the first scan as shown in FIG. 4A with the whole image of the scan area S in the second scan as shown in FIG. 4C and combines, in the above-described manner, the front-side image and the back-side image of the original document G1, the front-side image and the back-side image of the original document G2 overlapping with each other, and the front-side image and the back-side image of the original document G3 overlapping with each other (step S107).

Then, the image processing section 54 rotates or moves, for each of the original documents G1, G2, and G3, the back-side image of the original document as shown in FIG. 4D to match up the front-side image and the back-side image of the original document in position with each other (step S108).

The image forming apparatus 10 has the function of switching the positions of the back-side images of the original documents G1, G2, G3 after S108. This image position switch processing is performed, for example, when the positions of the original documents G1, G2, G3 have been switched by mistake during a user's work of turning over the original documents G1, G2, G3 placed on the platen glass 31.

The control section 51 allows the display section 42 to display, for example, as shown in FIG. 9A, a set of front-side images of the original documents G1, G2, G3 placed on the platen glass 31 and a set of back-side images thereof placed on the platen glass 31, alongside each other on the screen. The user views the screen of the display section 42 and checks whether or not the positions of the original documents G1, G2, G3 have been switched by mistake. When determining that the positions of the original documents G1, G2, G3 have been switched, the user makes touch gestures on the back-side images of two original documents switching positions and then makes a touch gesture on a Switch Positions button 62.

When the touch gestures on the back-side images of the two original documents and the touch gesture on the Switch Positions button 62 are sequentially accepted through the touch panel 45 by the control section 51 ("Yes" in step S109), the image processing section 54 subjects the image data representing the whole image of the scan area S containing the back-side images of the original documents to processing for switching the positions of the images representing the two original documents on which the touch gestures have been made (step S110).

For example, when in FIG. 9A touch gestures are made on the back-side images of two original documents G1 and G2 and a touch gesture is then made on the Switch Positions button 62, the image processing section 54 switches the positions of the two original documents G1 and G2 within the whole image of the scan area S as shown in FIG. 9B, so that, for each of the original documents G1 and G2, the front-side image and back-side image of the original document are aligned in position in terms of the whole image of the scan area S.

On the other hand, when the positions of the original documents G1, G2, G3 are not switched incorrectly, a touch gesture is made on an OK button 63, and the touch gesture on the OK button 63 is accepted through the touch panel 45 by the control section 51 ("No" in step S109), the processing in step S110 is not performed. In this case, for example, the positions of the back-side images of the original documents G1, G2, G3 shown in FIG. 9B are maintained without any change.

During the work of turning over the original documents, the back-side images of the original documents may be turned upside down. The user selects, among the front-side images and the back-side images of the original documents G1, G2, G3 placed on the platen glass 31 and being displayed on the display section 42 under control of the control section 51, any upside-down document by a touch gesture and then makes a touch gesture on an Invert button 64. When the touch gesture on the back-side image of the original document and the touch gesture on the Invert button 64 are sequentially accepted through the touch panel 45 by the control section 51, the image processing section 54 subjects the image data representing the whole image of the scan area S to processing for vertically inverting the back-side image of the original document on which the touch gesture has been made.

Furthermore, the image processing section 54 sets the coordinate system A as shown in FIG. 6A, determines, for each of the front-side images of the original documents G1, G2, and G3, the coordinates of the corners of the front-side image, sets the coordinate system B as shown in FIG. 6B, calculates, for each of the back-side images of the original documents G1, G2, and G3, the coordinates of the corners of the back-side image based on the above Equations (1) to (4), and moves the back-side image so that the corners of the back-side image are aligned with the calculated coordinates of the corners thereof (step S111). In other words, with reference to the leading end of a recording paper sheet P, the positions and orientations of the back-side images of the original documents G1, G2, G3 on the back side of the recording paper sheet P are appropriately changed. Thus, the front-side image and back-side image of each of the original documents G1, G2, G3 are brought into alignment and coincidence between the front side and back side of the recording paper sheet P, which enables the front-side image and back-side image of the original document to be cut out as a reproduction for a business card or any other card from a single recording paper sheet P. Moreover, according to this embodiment, since the edges of the original document are approximately parallel to the main scanning direction Y and sub-scanning direction X (the edges of the recording paper sheet P), the original document can be easily cut out.

In the above embodiment, the orientation of the front-side image of each original document is changed, the front-side image of this original document is combined with the back-side image thereof, and the back-side image of the original document is then moved based on the above Equations (1) to (4). However, the image processing section 54 can also align the front-side image and back-side image of each original document in terms of the whole image of the scan area S between the front side and the back side of the recording paper sheet P by omitting the change in orientation of the front-side image and the position matching of the back-side image with the front-side image and simply moving the back-side image of the original document based on the above Equations (1) to (4).

Figure 10A:
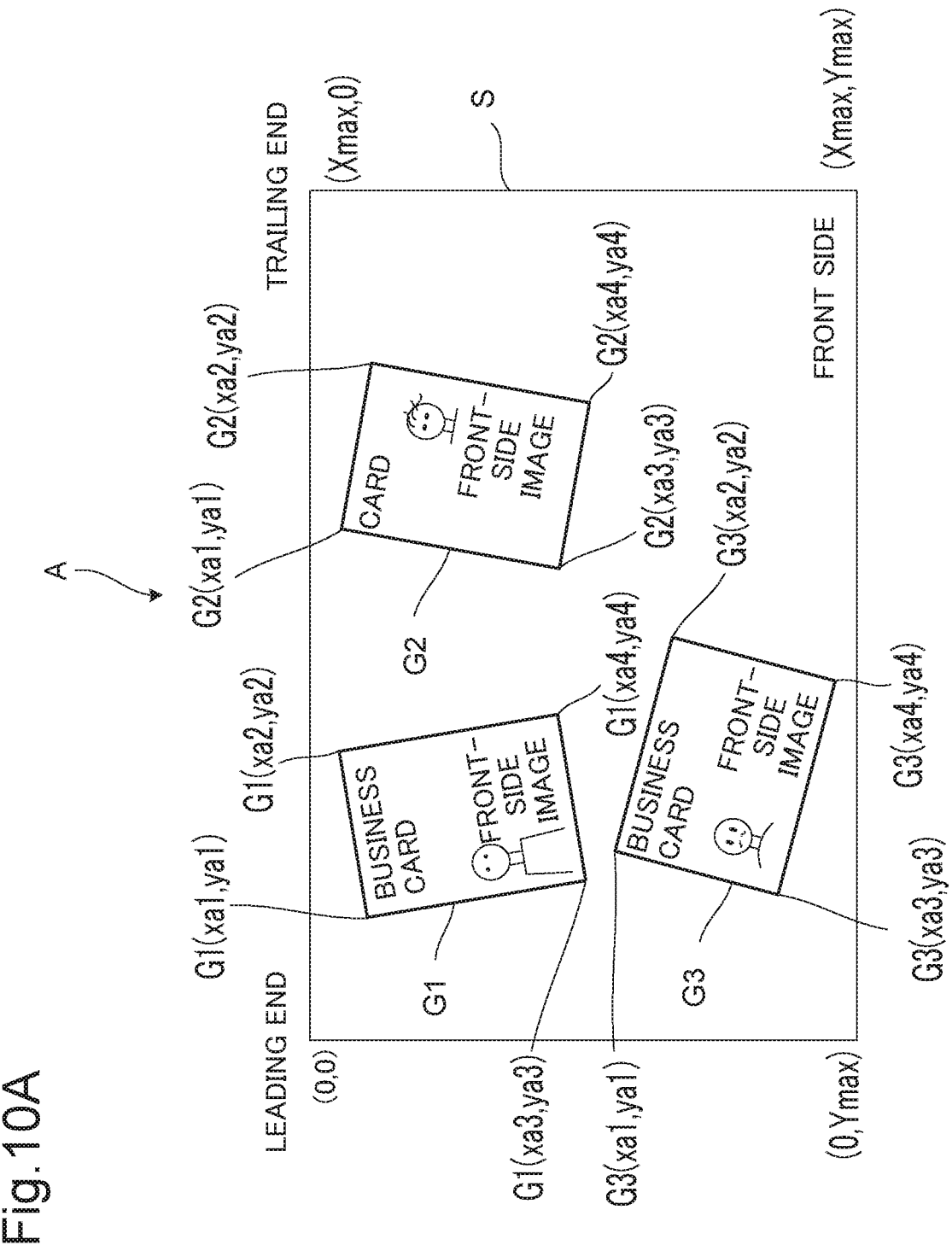

For example, even if the front-side images of the original documents G1, G2, G3 in the coordinate system A are tilted as shown in FIG. 10A, the image processing section 54 combines, for each of the original documents G1, G2, and G3, the front-side image of the original document with the back-side image thereof, then calculates, for each of the back-side images of the original documents G1, G2, and G3, the coordinates of the corners of the back-side image of the original document based on the above Equations (1) to (4), and moves and inclines the back-side images of the original documents so that the front-side image and back-side image of each original document are brought into alignment and coincidence in terms of the whole image of the scan area S between the front side and back side of the recording paper sheet P.

Furthermore, the original document may be preliminarily scanned by the image reading section 11 in order to detect the edges of the original document and may be then finally scanned by the image reading section 11 in order to read the images of the original document, and the density, contrast, resolution, and so on of the whole image of the scan area S read by the image reading section 11 may vary between the preliminary scan and the final scan.

The structures and processing described with reference to FIGS. 1 to 10 are merely embodiments of the present invention and the present invention is not intended to be limited to the above structures and processing.

REFERENCE SIGNS LIST

10 image forming apparatus
11 image reading section
12 image forming section
41 control unit
42 display section
43 image memory
44 operating section
45 touch panel
46 storage section
51 control section
54 image processing section

The invention claimed is:

1. An image forming apparatus comprising:
   an image reading section that reads images of an original document;
   a control unit that includes a processor and functions, through the processor executing a control program, as:
     a control section that allows the image reading section to read a front-side image of the original document in a first scan and then read a back-side image of the original document in a second scan; and an image processing section that detects the front-side image of the original document from a whole image of a first scan area read in the first scan by the image reading section, changes an orientation of the front-side image by rotating the front-side image so that two edges of the front-side image extend along a main scanning direction and the other two edges of the front-side image extend along a sub-scanning direction, detects the back-side image of the original document from a whole image of a second scan area read in the second scan by the image reading section, changes an orientation of the back-side image by rotating the back-side image so that two edges of the back-side image extend along the main scanning direction and the other two edges of the back-side image extend along the sub-scanning direction, and performs image processing of moving or rotating the front-side image or the back-side image of the original document to move a position of the front-side image in the whole image of the first scan area or the back-side image in the whole image of the second scan area to a position where the front-side image and the back-side image are brought into alignment and coincidence between a front side and a back side of a recording paper sheet; and an image forming section that, under control of the control section, forms on the front side of the recording paper sheet the whole image of the first scan area read in the first scan and subjected to the image processing by the image processing section and forms on the back side of the recording paper sheet the whole image of the second scan area read in the second scan and subjected to the image processing by the image processing section, wherein the image processing section compares the whole image of the first scan area with the whole image of the second scan area and combines each pair of images equal or approximately equal in horizontal and vertical sizes of a rectangular region and nearest in position within the whole image of the first scan area and the whole image of the second scan area as a pair of images forming front and back sides of the original document.

2. The image forming apparatus according to claim 1, wherein during the image processing the image processing section moves or rotates the back-side image of the original document with reference to a leading end of the recording paper sheet to align a position of the back-side image of the original document with a position of the front-side image of the original document on the recording paper sheet, and the control section allows the image forming section to form the front-side image of the original document starting at the leading end of the recording paper sheet in forming the front-side image on the front side of the recording paper sheet, and allows the image forming section to form the back-side image of the original document starting at a trailing end of the recording paper sheet in forming the back-side image on the back side of the recording paper sheet.

3. The image forming apparatus according to claim 1, wherein the image processing section detects the front-side image and the back-side image of the original document by detecting edges of the original document based on the whole image of the first scan area and the whole image of the second scan area, and extracting an image of the original document surrounded by the edges.

4. The image forming apparatus according to claim 3, wherein the image processing section detects the edges of the original document based on a density difference between regions within and outside the edges in the whole image of the first scan area and the whole image of the second scan area.

5. The image forming apparatus according to claim 1, further comprising an operating section capable of being operated by a user, wherein when the user operates the operating section to give an instruction to switch positions of images of two original documents within the whole image of the first scan area or the whole image of the second scan area, the image processing section switches the positions of the two original documents.

6. The image forming apparatus according to claim 1, further comprising an operating section capable of being operated by a user, wherein when the user operates the operating section to give an instruction to make a vertical inversion of the image of the original document within the whole image of the first scan area or the whole image of the second scan area, the image processing section vertically inverts the image of the original document subjected to the instruction for the vertical inversion.

\* \* \* \* \*